United States Patent
Ryu et al.

(10) Patent No.: US 10,084,185 B2
(45) Date of Patent: Sep. 25, 2018

(54) CATHODE FOR ALL SOLID-STATE LITHIUM SULFUR BATTERY

(71) Applicant: Hyundai Motor Company, Seoul (KR)

(72) Inventors: Hee Yeon Ryu, Yongin-si (KR); Hee Jin Woo, Suwon-si (KR); Ji Man Kim, Suwon-si (KR); Su Yeon Bae, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 47 days.

(21) Appl. No.: 14/932,736

(22) Filed: Nov. 4, 2015

(65) Prior Publication Data

US 2016/0308204 A1 Oct. 20, 2016

(30) Foreign Application Priority Data

Apr. 16, 2015 (KR) .......................... 10-2015-0053705

(51) Int. Cl.
| | |
|---|---|
| *H01M 4/38* | (2006.01) |
| *H01M 10/0562* | (2010.01) |
| *H01M 10/052* | (2010.01) |
| *H01M 4/58* | (2010.01) |
| *H01M 4/02* | (2006.01) |

(52) U.S. Cl.
CPC ........... *H01M 4/38* (2013.01); *H01M 4/5815* (2013.01); *H01M 10/052* (2013.01); *H01M 10/0562* (2013.01); *H01M 2004/028* (2013.01); *H01M 2300/0068* (2013.01); *Y02T 10/7011* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,791,043 | B2 * | 7/2014 | Pak | H01M 4/8814 423/445 R |
| 8,980,471 | B2 * | 3/2015 | Muldoon | H01M 4/622 429/211 |
| 9,567,439 | B1 * | 2/2017 | Pyun | C01B 17/96 |
| 9,917,303 | B2 * | 3/2018 | Wang | H01M 4/366 |
| 2008/0160391 | A1 | 7/2008 | Jog et al. | |
| 2011/0059361 | A1 * | 3/2011 | Wilkening | H01M 4/136 429/218.1 |

(Continued)

FOREIGN PATENT DOCUMENTS

| | | |
|---|---|---|
| JP | 2014-522547 A | 9/2014 |
| KR | 10-2003-0051143 A | 6/2003 |

(Continued)

OTHER PUBLICATIONS

Wang, D. et al., "Carbon-sulfur composites for Li—S batteries: status and prospects", Journal of Materials Chemistry A, 2013, 1, pp. 9382-9394.

(Continued)

*Primary Examiner* — Kaity V Chandler
(74) *Attorney, Agent, or Firm* — McDermott Will & Emery LLP

(57) ABSTRACT

A cathode for an all solid-state lithium sulfur battery includes a porous conductive material, which is manufactured from a precursor containing sulfur, and contains the sulfur in a backbone and a sulfur active material, which is injected into pores of the porous conductive material.

8 Claims, 3 Drawing Sheets

(56) References Cited

U.S. PATENT DOCUMENTS

| | | | | |
|---|---|---|---|---|
| 2012/0115048 | A1* | 5/2012 | Roev | B82Y 30/00 429/405 |
| 2013/0065128 | A1* | 3/2013 | Li | H01M 4/136 429/218.1 |
| 2013/0183547 | A1* | 7/2013 | Kourtakis | H01M 4/62 429/50 |
| 2013/0224594 | A1* | 8/2013 | Yushin | H01M 4/38 429/218.1 |
| 2014/0141328 | A1* | 5/2014 | Dai | H01M 4/137 429/217 |
| 2014/0186522 | A1 | 7/2014 | Woo et al. | |
| 2015/0171463 | A1* | 6/2015 | Liang | H01M 10/052 429/322 |
| 2016/0087266 | A1* | 3/2016 | Muldoon | H01M 4/625 429/213 |

FOREIGN PATENT DOCUMENTS

| | | |
|---|---|---|
| KR | 10-2013-0107071 A | 10/2013 |
| KR | 10-2013-0133217 A | 12/2013 |
| KR | 10-2014-0001935 A | 1/2014 |
| KR | 10-2014-0019062 A | 2/2014 |
| KR | 10-1384630 B1 | 4/2014 |
| KR | 10-2014-0073936 A | 6/2014 |

OTHER PUBLICATIONS

Lim, J. et al. "Recent Approaches for the Direct Use of Element Sulfur in the Synthesis and Processing of Advanced Materials", Angewandte Chemie International Edition, vol. 54, Issue 11, Mar. 2015, pp. 3249-3258.

* cited by examiner

CATHODE FOR ALL SOLID-STATE LITHIUM SULFUR BATTERY

CROSS-REFERENCE TO RELATED APPLICATION

This application, under 35 U.S.C. § 119(a), claims the benefit of priority to Korean Patent Application No. 10-2015-0053705, filed on Apr. 16, 2015 with the Korean Intellectual Property Office, the entire contents of which are incorporated herein by reference.

TECHNICAL FIELD

The present disclosure relates to a cathode for an all solid-state lithium sulfur battery, which comprises a porous conductive material containing sulfur in a backbone and a sulfur active material injected into pores of the porous conductive material.

BACKGROUND

Today, a secondary battery is widely used as in devices ranging from vehicles and power storage systems to small devices such as mobile phones, camcorders and notebooks.

As the secondary battery, a lithium secondary battery has an advantage of larger capacity per unit area than a nickel-manganese battery or a nickel-cadmium battery.

However, the lithium secondary battery is not suitable for a next-generation battery applicable to a vehicle because it may overheats, and its energy density is little better than about 360 Wh/kg.

Thus, there is an interest in a lithium sulfur secondary battery having a high power and a high energy density.

The lithium sulfur secondary battery refers to a battery using sulfur as a cathode active material and lithium metal as an anode. As its theoretical energy density reaches 2600 Wh/kg, it is suitable to be used as a battery for an electric vehicle requiring high power and high energy density.

In general, the lithium sulfur secondary battery uses a liquid electrolyte, which is convenient in handling. However, there are problems because a sulfide-based compound is dissolved in the liquid electrolyte and life time may become short. Further, the liquid electrolyte may leak and a fire could result at high temperatures.

Thus, there is an interest in an all-solid state lithium sulfur battery, wherein the liquid electrolyte is replaced with a solid electrolyte. The all solid-state lithium sulfur battery has advantages in its stability is high at high voltages. Further, it is easy to improve energy density per volume by simplifying the battery structure through lamination of unit cells.

However, the all solid-state battery has problems in that availability of the sulfur as a cathode active material (the amount of the sulfur used/the amount of the sulfur injected) is low, and the battery structure may become collapsed because the sulfur is lost during its reversible oxidation and reduction.

These are the problems that commonly occur in the battery using sulfur as a cathode active material. Korean Patent Publication No. 10-1384630 and Korean Patent Laid-Open Publication No. 10-2014-0001935 try to solve the problems by using a porous material as a conductive material (carbon material) of the cathode to increase the amount of the sulfur injected into the cathode.

Accordingly, the applicants reached the present disclosure as a result of continuous researching for solving the listed problems.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

The present disclosure is objected to improve discharging capacity and life time of an all-solid state lithium sulfur battery by using a porous carbon material containing sulfur in a backbone.

The object of the present disclosure is not limited to the above-described object, and other objects of the present disclosure that have not been described will be clearly understood by the following description.

To achieve the above objects, the present disclosure includes the following constituents.

In one aspect, the present disclosure provides a cathode (positive) for an all solid-state lithium sulfur battery comprising: a porous conductive material, which is manufactured from a precursor containing sulfur, and contains the sulfur in a backbone; and a sulfur active material, which is injected into pores of the porous conductive material.

In a preferred embodiment, the sulfur content in the backbone may be controlled depending on the precursor content.

In another preferred embodiment, the precursor may be 4,4'-Thiobisbenzene.

In another preferred embodiment, the precursor may be p-Toluene sulfonic acid.

In still another preferred embodiment, the porous conductive material may contain the sulfur in the backbone in an amount of 9 to 45 wt %.

In yet another preferred embodiment, the sulfur active material may be injected in an amount of 40 to 60 parts by weight, based on the porous conductive material of 100 parts by weight.

In another preferred embodiment, the cathode for an all solid-state lithium sulfur battery may further comprise a sulfide-based solid electrolyte.

In another preferred embodiment, the solid electrolyte may be $Li_{10}SnP_2S_{12}$.

In another preferred embodiment, the solid electrolyte may be $Li_2S$—$P_2S_5$.

In another aspect, the present disclosure may provide an all solid-state lithium sulfur battery comprising any embodiment of a cathode as described in the present disclosure.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
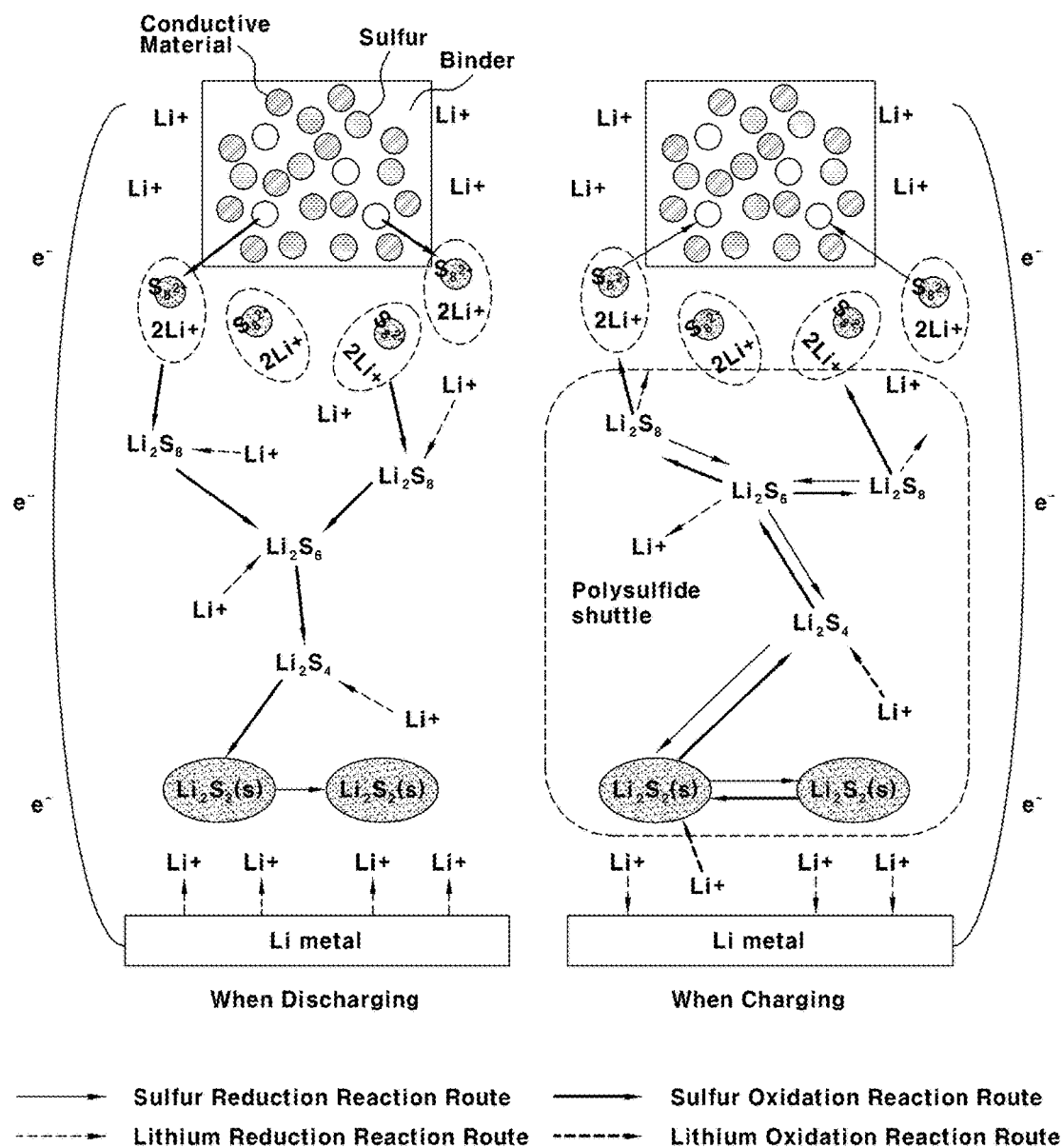
FIG. 1 is a drawing for explaining a mechanism of charging and discharging of the conventional lithium sulfur battery using the liquid electrolyte.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure will be described in detail. However, the embodiments of the present disclosure may be modified in various ways, and the scope of the present disclosure should not be interpreted as being limited to the examples. The embodiments of the present disclosure are provided just for explaining the present disclosure more perfectly to those having ordinary skill in the art.

Further, if it is determined that detailed description of known functions or constructions may unnecessarily obscure the gist of the present disclosure, the detailed description thereof will be omitted. Unless explicitly stated to the contrary, the word "comprise," "comprises" or "comprising" used throughout the specification will not be understood as the exclusion of the other elements but to imply the inclusion of the other elements.

FIG. 1 is a drawing for explaining a mechanism of charging and discharging of a conventional lithium sulfur secondary battery.

The lithium sulfur secondary battery includes a cathode (positive), an anode (negative), and an electrolyte interposed between the cathode and the anode. The cathode contains sulfur as an active material, a conductive material, a solid electrolyte and a binder. The anode may be a lithium anode.

When discharging the lithium sulfur secondary battery, electrons move from the lithium anode (Li metal) to the cathode. The electrons moving along the conductive material in the cathode bind to the sulfur adjacent to the surface of the conductive material. The sulfur is reduced to $S_8^{2-}$, and the $S_8^{2-}$ binds to lithium ions to form $Li_2S_8$ (Long-chain polysulfide). The $Li_2S_8$ is converted to $Li_2S_2/Li_2S$ (Short-chain polysulfide) on the surface of the lithium anode by continuous reaction to the lithium ions.

In reverse, when charging, oxidation occurs to form $S_8^{2-}$, and the $S_8^{2-}$ loses electrons on the surface of the conductive material, and goes back to the sulfur.

The all solid-state lithium sulfur battery has low availability of the sulfur as an active material in the cathode, and therefore real energy density does not reach theoretical energy density.

Conventionally, the amount of the sulfur injected is increased using the porous conductive material. However, when discharging, the sulfur, which can participate in a reduction reaction, is only the sulfur adjacent to the surface of the conductive material. The problem can't be solved by only simply increasing the amount of the sulfur injected.

On the contrary, the porous conductive material according to the present disclosure contains the sulfur in the backbone itself. Therefore, discharging capacity can be improved because i) the amount of the sulfur in the cathode is increased, and ii) availability of the sulfur is increased.

The form of the all solid-state lithium sulfur battery is constantly changed when charging and discharging because the sulfur and the lithium are oxidized and reduced. However, after 1 cycle of charging and discharging, the sulfur goes back to its original form, i.e., sulfur particle (Sulfur). At this time, if the sulfur is lost, or it goes back to the sulfur particle far from the conductive material, the battery structure becomes unstable, thereby reducing battery life.

The cathode for the all solid-state lithium sulfur battery according to the present disclosure uses the sulfur, wherein the cathode active material (sulfur active material) is contained in the backbone of the porous carbon material, as a foothold during charging. Thus, it can maintain structure stably, and life time is reduced slowly.

The cathode for the all solid-state lithium sulfur battery of the present disclosure may comprise: the porous conductive material, which is manufactured from a precursor containing the sulfur and contains the sulfur in the backbone; and the sulfur active material and the solid electrolyte, which are injected into pores of the porous conductive material.

The "sulfur active material" means the sulfur as an active material, which is injected into the pores of the porous conductive material, or distributed in the cathode outside of the porous conductive material. Thus, it is distinguished from the sulfur contained in the backbone of the porous conductive material.

Figure 2:
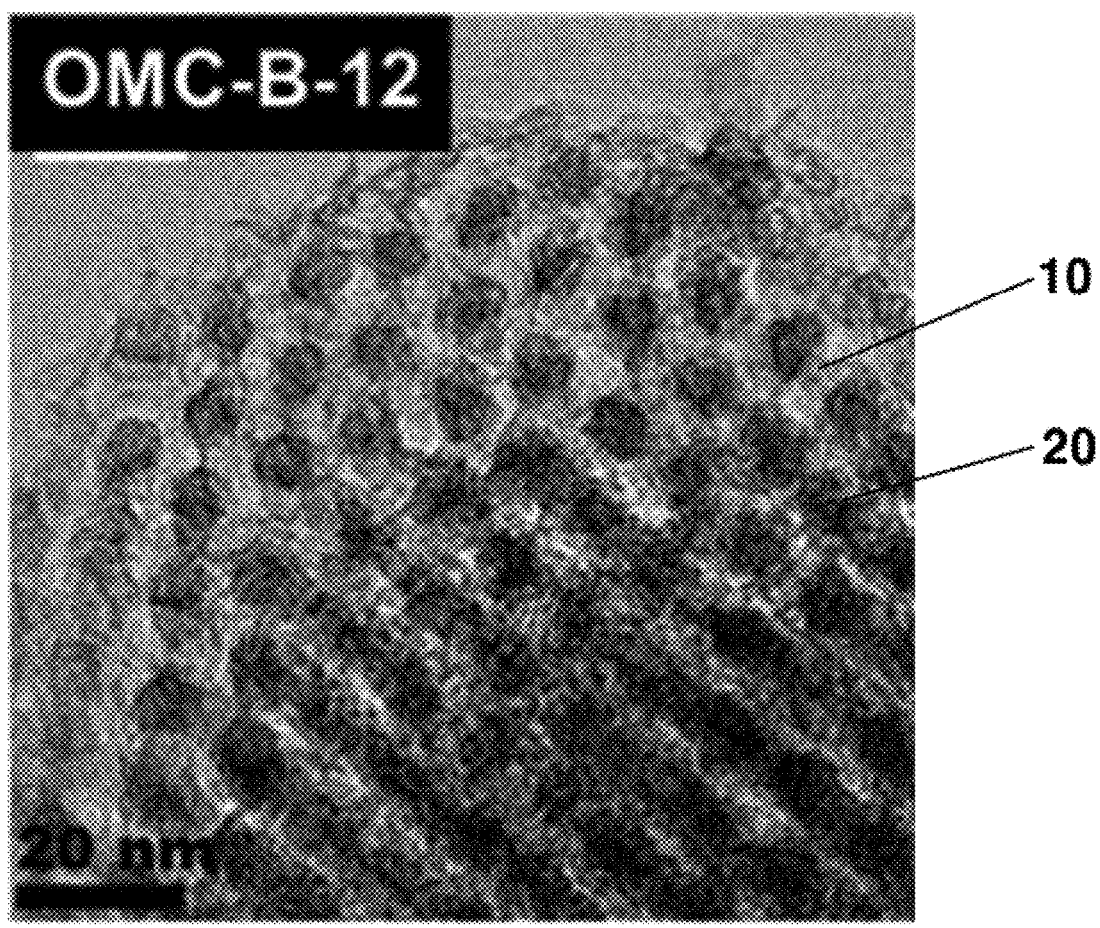
FIG. 2 and FIG. 3 are drawings briefly illustrating a structure of porous carbon material according to the present disclosure.
Figure 3:
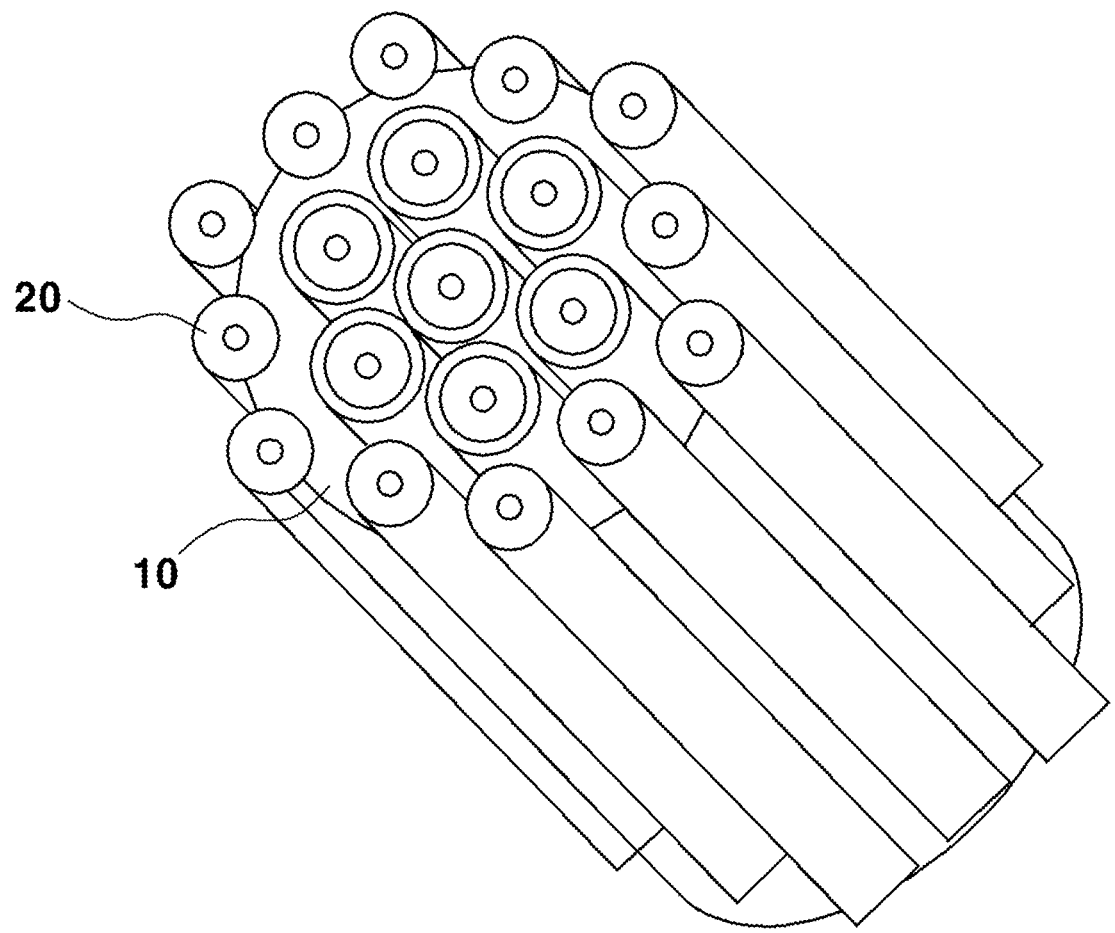

Referring to FIG. 2, the porous conductive material may consist of pores and a backbone. Because the sulfur active material is injected to the pores, the amount of the sulfur active material injected in the cathode is increased, as compared to when using the conductive material such as Acetylene Black, Vapor Grown Carbon Fiber (VGCF) and the like.

The backbone is a constitution of maintaining the structure of the porous conductive material. When charging and discharging, it may also play a role of a passage of the electrons in the cathode.

The backbone contains the sulfur. Thus, the electrons moving through the backbone may react with the sulfur as well as the sulfur active material. Therefore, availability of the sulfur is increased, and a discharging capacity of the battery is improved.

The sulfur active material is reduced to the $S_8^{2-}$ when discharging, and then slipped out the pores. Then, when charging, the $S_8^{2-}$ is oxidized, thereby forming the sulfur active material again. At this time, if the sulfur active material is not made on the surface of the porous conductive material or in the pores, and is formed at other parts in the cathode, the battery structure becomes unstable. Disadvantageously, it is lost, and therefore life time may be reduced.

In the present disclosure, the sulfur contained in the backbone works as a kind of a foothold to the sulfur active material. "Working as a foothold" means providing a site where the $S_8^{2-}$ is oxidized when charging the battery, and inducing the sulfur active material to be formed on the surface of the porous conductive material or in the pores. Thus, the structure of the all-solid state battery is maintained stably, thereby increasing life time.

The porous conductive material such as Ordered Mesoporous Carbon (OMC) is made by using the sucrose of the following Chemical Formula 1 as a precursor. However, the porous conductive material according to the present disclosure is made by using the precursor containing the sulfur such as 4,4'-Thiobisbenzene of the following Chemical Formula 2 or p-Toluene sulfonic acid. Thus, the sulfur may be contained in the backbone.

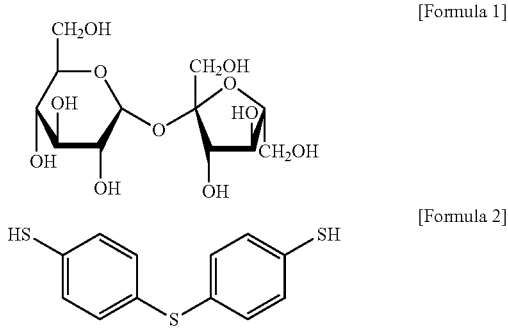

[Formula 1]

[Formula 2]

When manufacturing the porous conductive material, among the raw materials, the content of the sulfur contained in the backbone is controlled depending on the content of the precursor containing the sulfur.

The content of the sulfur contained in the backbone may be 9 to 45 wt %, preferably 22 to 45 wt %, more preferably 45 wt %, based on the total weight of the porous conductive material.

The sulfur should be contained in an amount of 9 to 45 wt % to improve discharging capacity and life time, and also to maintain the structure of the porous conductive material. If the content of the sulfur is over 45 wt %, the content of the carbon is reduced, and therefore the backbone of the porous carbon material can't be maintained.

The sulfur active material has a constitution that it is injected into the pores of the porous carbon material, and then oxidized/reduced when charging and discharging the all solid-state battery.

The sulfur active material may be injected in an amount of 40 to 60 parts by weight, preferably 50 parts by weight, based on the porous conductive material 100 parts by weight.

EXAMPLES

The following examples illustrate the disclosure and are not intended to limit the same.

Examples 1 to 6

(1) As a precursor containing sulfur, 4,4'-Thiobisbenzene was used. By controlling the content of the precursor, a porous conductive material containing the sulfur in a backbone in an amount of 9, 13, 18, 22, 36 and 45 wt % was manufactured.

(2) The sulfur active material was melted at 155° C. The sulfur active material was mixed with the porous conductive material, and the mixture was injected into pores of the porous conductive material. The sulfur active material was injected into the porous conductive material in an amount of 50 parts by weight, based on 100 parts by weight.

(3) $Li_{10}SnP_2S_{12}$ as a solid electrolyte was mixed to the resulting material of the step (2) at 300 rpm for 17 hours, using a planetary mill to manufacture a slurry.

(4) The slurry was coated on an aluminum foil to manufacture a cathode.

(5) $Li_{10}SnP_2S_{12}$ was coated on top of the cathode to form a solid electrolyte film.

(6) A lithium foil was compressed on top of the solid electrolyte film to manufacture an anode.

(7) Accordingly, the completed all solid-state lithium sulfur battery has structure of the cathode, the anode and the solid electrolyte film interposed between the cathode and the anode.

In this Example, the $Li_{10}SnP_2S_{12}$ was used as the solid electrolyte, but not limited thereto, and other sulfide-based solid electrolyte such as $Li_2S$—$P_2S_5$ and the like may be used.

By controlling the content of the precursor containing the sulfur, the porous conductive material, which contains the sulfur in the backbone in an amount of greater than 45 wt %, was desired to be manufactured, but it could not be applied to the following Measuring Example because its backbone was not maintained properly.

Measuring Example

The initial discharging capacity of the all-solid state lithium sulfur battery manufactured in Examples 1 to 6 and $20^{th}$ discharging capacity after conductive 20 cycles of charging and discharging thereof were measured. The results are as shown in the following Table 1.

TABLE 1

| | Sulfur Content In Backbone | $1^{st}$ Discharging Capacity [mAh/g] | $20^{th}$ Discharging Capacity [mAh/g] |
| --- | --- | --- | --- |
| Example 1 | 9.02 wt % | 803 | 240 |
| Example 2 | 13.6 wt % | 822 | 344 |
| Example 3 | 18.1 wt % | 819 | 574 |
| Example 4 | 22.6 wt % | 938 | 601 |
| Example 5 | 36.3 wt % | 997 | 623 |
| Example 6 | 45.4 wt % | 1011 | 654 |

Referring to above Table 1, it can be found that as the content of the sulfur in the backbone of the porous conductive material approaches 45 wt %, discharging capacity is improved, and capacity reduction rate according to repeat of charging and discharging is lowered.

Namely, the present disclosure can improve discharging capacity of the all solid-state lithium sulfur battery because the sulfur contained in the backbone of the porous conductive material as well as the sulfur active material can participate in a reduction reaction when discharging.

Further, the present disclosure can improve charging and discharging efficiency and a life time of the all solid-state lithium sulfur battery because the sulfur contained in the backbone of the porous conductive material plays a role of a foothold to maintain its structure stably when the sulfur active material goes back to the sulfur particle (sulfur) by oxidation reaction while charging.

The present disclosure including the constitution can have the following effects.

The cathode for an all solid-state lithium sulfur battery of the present disclosure has an effect of improving discharging capacity of the all solid-state battery because the sulfur contained in the backbone of the porous carbon material participates in an oxidation/reduction reaction.

Further, the cathode for an all solid-state lithium sulfur battery of the present disclosure can maintain its structure stably because the cathode active material goes back to its original form by using the sulfur contained in the backbone of the porous carbon material as a foothold during oxidation reaction of the charging process, and therefore can provide the all solid-state lithium sulfur battery with improved life time characteristic.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A cathode for an all solid-state lithium sulfur battery comprising:
 a porous conductive material having a structure which consists of pores and a backbone; and
 a sulfur active material, which is injected into pores of the porous conductive material,
 wherein the backbone is manufactured from a precursor containing a sulfur, and the backbone contains the sulfur in an amount of 22 to 45 wt %.

2. The cathode for an all solid-state lithium sulfur battery of claim 1, wherein the precursor is 4,4'-Thiobisbenzene.

3. The cathode for an all solid-state lithium sulfur battery of claim 1, wherein the precursor is p-Toluene sulfonic acid.

4. The cathode for an all solid-state lithium sulfur battery of claim 1, wherein the sulfur active material is injected in an amount of 40 to 60 parts by weight, based on the porous conductive material of 100 parts by weight.

5. The cathode for an all solid-state lithium sulfur battery of claim 1, which further comprises a sulfide-based solid electrolyte.

6. The cathode for an all solid-state lithium sulfur battery of claim 5, wherein the solid electrolyte is $Li_{10}SnP_2S_{12}$.

7. The cathode for an all solid-state lithium sulfur battery of claim 5, wherein the solid electrolyte is $Li_2S-P_2S_5$.

8. An all solid-state lithium sulfur battery comprising the cathode of claim 1.

* * * * *